July 10, 1951

I. L. ASHKENAS 2,559,817

FULLY POWERED AIRPLANE CONTROL SYSTEM

Filed Dec. 11, 1944

INVENTOR.
IRVING L. ASHKENAS
BY
ATTORNEY.

INVENTOR.
IRVING L. ASHKENAS
BY
ATTORNEY.

July 10, 1951     I. L. ASHKENAS     2,559,817
FULLY POWERED AIRPLANE CONTROL SYSTEM Filed Dec. 11, 1944     4 Sheets-Sheet 3

INVENTOR.
IRVING L. ASHKENAS
BY
ATTORNEY.

INVENTOR.
IRVING L. ASHKENAS
BY
ATTORNEY.

Patented July 10, 1951

2,559,817

UNITED STATES PATENT OFFICE 2,559,817

FULLY POWERED AIRPLANE CONTROL SYSTEM

Irving L. Ashkenas, Los Angeles, Calif., assignor to Northrop Aircraft, Inc., Hawthorne, Calif., a corporation of California Application December 11, 1944, Serial No. 567,683

12 Claims. (Cl. 244—82)

This invention relates to aircraft, and more particularly to power means for operating the control surfaces. The increasing size and speed of present and proposed airplanes has brought with it larger control surfaces and greater airloads thereon, until the point has been reached where the force required to move the control column is substantially equal to or greater than the strength of the pilot. In order to relieve the pilot of the physical strain of flying these large airplanes, the design of control systems has followed two trends, one being along the line of aerodynamic balances wherein an element of the control surface is acted upon by the airstream in a manner to provide a counterbalancing hinge moment opposite to and somewhat less than the hinge moment produced by the portion aft of the hinge axis. The other trend has been toward so-called power boost systems, either mechanical, electrical or hydraulic, attached to the pilot's control system and supplying some part of the energy required for movement of the control surfaces against the air loads acting thereon. The power boost is supplied by motor means driven by a suitable source of power, a valve or switch being operated by the pilot as he operates his control column so that both pilot power and motor power are simultaneously applied to the control surfaces, and so that at least part of the air loads on the surfaces can be felt by the pilot.

The outstanding disadvantage of all power boost systems which are driven from some source of power in the airplane lies in their dependency upon the unfailing delivery of power, for with the failure of the power source, the booster mechanism becomes inoperative and the pilot is forced to rely upon his own strength to operate the controls until the airplane can be brought safely down to ground. If the pilot is incapable of handling the controls, the almost inevitable result is a disastrous crash.

Aerodynamic balances, on the other hand, are not subject to failure of the power source, since the operating force is present as long as the airplane is moving through the air. Such balances may be in either one of two forms, namely, external, wherein the balance portion is exposed to and is acted upon directly by the airstream; or internal, in which case the balance portion is disposed within a chamber and forms a sealed partition therein, the chamber being vented to the atmosphere on both sides of the airfoil adjacent the hinge line. The differential air pressures at the vents on opposite sides of the airfoil resulting from initial deflection of the control surface produces a pressure difference within the chamber on opposite sides of the balance, creating a hinge moment which aids the pilot in moving the control surface.

Aerodynamic balances are not without their drawbacks, however, chief of which is the phenomenon known as stick-force reversal which occurs when the wing or other airfoil is close to the stalling angle. At this point, and with the onset of separation of the boundary layer from the airfoil surface, the more or less rectangular chordwise pressure distribution obtained for a stalled or partly stalled control surface, as opposed to the normally obtained triangular distribution, creates an increment of hinge moment which causes the control surface to tend to trail upwardly. This upwardly trailing tendency of the control surfaces is highly objectionable to the pilot because it produces stick-force instability near the stall, and is particularly a problem in the design of tailless airplanes wherein the elevons are rigged to move up or down simultaneously. In order to eliminate stick-force reversal, it would be necessary to use a balance area equal to or greater than the flap area itself, but in the case of internal balances this would necessarily limit the available flap deflection for wings of accepted thickness distribution to unsatisfactorily low values.

It is, therefore, one primary object of the present invention to provide an aerodynamic power boost arrangement for operating the control surfaces in which the source of power derives from the forward speed of the airplane and which is not subject to failure of the power plant, electrical system, or hydraulic system.

Another object of the invention is to provide an aerodynamic power boost mechanism having means responsive to the airspeed of the airplane for automatically actuating the boost mechanism to produce a hinge moment on the control surface overcoming the increment of hinge moment on the control surface caused by stalling or partially stalling the wing, thereby eliminating the occurrence of stick-force reversals.

Another object of the invention is to provide a power boost control system in which the operating force is applied uniformly along the span of the control surface, and which therefore produces no torsion in the control surface structure. In all prior power boost systems, the operating force is applied at a point near one end of the control surface, whereas the air loads are fairly uniform along the entire span of the control surface. The result is that the control surface twists, introducing aerodynamic changes which may be highly undesirable, and unduly stressing the structural members of the control surface.

A further object of the invention is to provide a control system embodying a follow-up system of linkage between the control surface and the control stick for actuating the power boost mechanism to produce the required force or hinge moment, regardless of its magnitude. One advantage of this feature is that it eliminates the need for a finely balanced control surface, which is a major design problem due to the condition, previously described, producing stick-force instability near the stall.

Still another object of the invention is to provide a control system incorporating an aerodynamic boost and also including means for loading the control system to impart a sense of feel thereto which duplicates faithfully the feel of directly connected controls, and in which the control forces vary substantially as the square of the air speed.

The above objects are attained in the present invention by providing ducts to take the available pressure from any advantageously located high pressure and low pressure sources, together with suitable valve means for mixing these pressures to provide a pressure differential in the balance chamber on opposite sides of the balance member, creating a hinge moment corresponding to the hinge moment of the airloads acting on the control surface. Means are also provided for actuating the valve responsive to the airspeed of the airplane to overcome the upwardly trailing tendency of the control surface, and in one embodiment of the invention such means is in the form of a freely floating flipper at the trailing edge of the wing or other airfoil which is connected to the valve by suitable linkage so that as the flipper tends to trail upwardly with increasing angle of attack, the valve is actuated in a manner to reduce the trailing angle of the control surface to the desired value.

These and other objects and advantages of the present invention will become apparent to those skilled in the art after consideration of the following detailed description of the preferred embodiment thereof, reference being had to the accompanying drawings in which.

Figure 1:
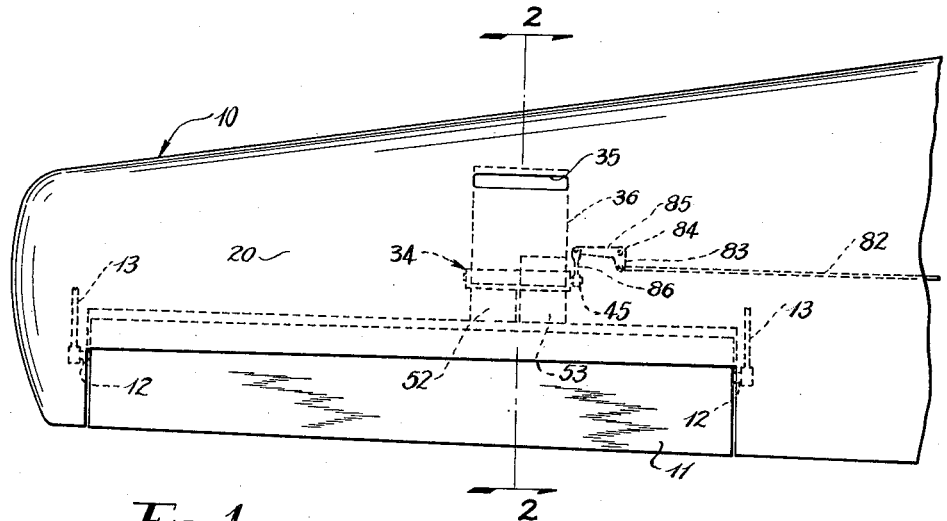
Fig. 1 is a top plan view of the outer end portion of a wing having a movable control surface and an aerodynamic boost mechanism therefor embodying the principles of the invention.

In Fig. 1 of the drawings, the reference numeral 10 designates a wing or other airfoil, such as one of the tail surfaces in a conventional airplane, the trailing edge portion for a substantial spanwise length thereof being formed by a movable control surface 11. The control surface 11 may be either the aileron, elevator, or rudder of a conventional airplane, or the elevon, as it is called, in the tailless type of airplane, such elevons being simultaneously movable in the same direction to provide elevator controls, or simultaneously movable in opposite directions to provide aileron control. Hinge pins 12 are provided at the ends of control surface 11 and are journaled in bracket supports 13 which are mounted on the rear spar (not shown) of the wing and extend rearwardly therefrom.

Figure 7:
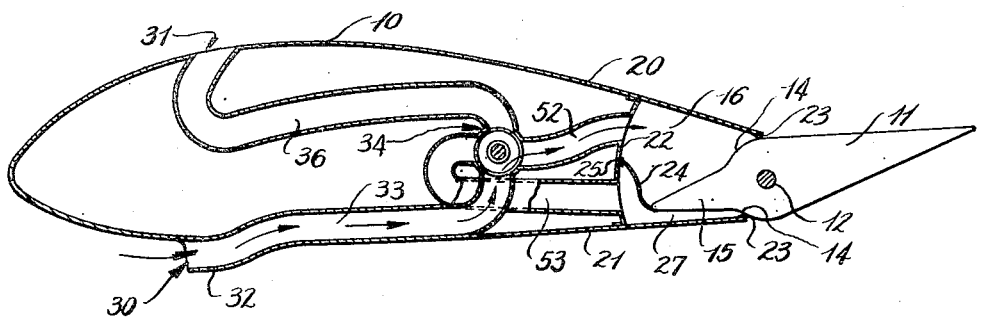
Fig. 7 is a view similar to Fig. 2, showing the position assumed by the control surface when the valve mechanism is rotated to the position shown in Figs. 5 and 6.

Ahead of the hinge axis 12, the top and bottom surfaces of the control surface 11 are cylindrically curved at 14 about the hinge axis as a center, terminating at the root of a forwardly extending balance portion 15, the top and bottom surfaces of which converge forwardly to a relatively sharp-nosed leading edge. The balance 15 is disposed within a chamber 16 formed in the rear edge of the wing by the upper skin 20, lower skin 21, and a front wall 22, the latter being preferably, although not necessarily, cylindrically curved about the hinge axis 12 as a center in order to reduce the volumetric capacity of the chamber 16 to the minimum. Suitable pressure seals 23 are provided along the rear edges of the upper and lower skins, respectively, which bear against the cylindrical portion 14 of the control surface to seal the chamber 16 pressure-tight. Attached to the nose of the balance 15 in any suitable manner is a flexible curtain or diaphragm 24 which is also attached at 25 to the wall 22. The curtain 24 has sufficient slack in it to permit maximum deflection of the control surface 11, as shown in Fig. 7, and together with the balance portion 15, divides the chamber 16 into an upper compartment 26 and a lower compartment 27, said compartments being pressure-tight from one another.

The control surface 11 is moved up or down by a differential air pressure condition created in compartments 26 and 27 on opposite sides of the balance 15, pressure being obtained from a high pressure source 30 and a low pressure source 31 and mixed in varying proportions to produce intermediate pressures which are led to the compartments 26 and 27, respectively. The high pressure source 30 is preferably in the form of a forwardly facing ram air scoop 32 which projects below the bottom skin 21 near the leading edge of the wing in a region where relatively high dynamic or impact pressures are encountered. The scoop 32 is connected by an entrance duct 33 to valve means, indicated generally by the reference numeral 34. The low pressure source 31 is preferably in the form of a rearwardly directed opening 35 in the upper skin 20 near the leading edge of the wing in a region where relatively high negative pressures are normally obtained. An exit duct 36 connects the opening 35 with the valve means 34.

The valve means 34 comprises a housing 40 having a cylindrical chamber 41 in its interior within which is disposed a close-fitting, rotatable, cylindrical valve member 42 mounted on a shaft 43. The shaft 43 is journaled in bearing portion 44 in the housing, and mounted on one of its ends outside of the housing 40 is a downwardly extending operating arm 45. The valve member 42 is in the form of a sleeve 46 having end plates 47 and a center portion 48 dividing the valve into two separate compartments. One-half of the sleeve wall on either side of the partition 48 is cut out, leaving hemicylindrical gates 50 and 51 which are angularly spaced apart 180° from one another.

The ducts 33 and 36 open into the bottom and top, respectively, of the valve housing 40 at 180° spaced angular relationship, providing ports which are adapted to be covered or uncovered by the gates 50 and 51 as the valve is rotated. A duct 52 which is connected to the top compartment 26 of the balance chamber 16 extends forwardly therefrom and connects into the left-hand compartment (see Fig. 4) of the valve on the backside thereof midway between ducts 33 and 36. Another duct 53 which is connected to the bottom compartment 27 extends forwardly beneath the valve housing 40 and bends around to connect into the right-hand compartment at its front side midway between ducts 33 and 36. It will be noted by comparing Figs. 5 and 6 that duct 52 lies opposite gate 50, while duct 53 lies opposite gate 51.

Figure 2:
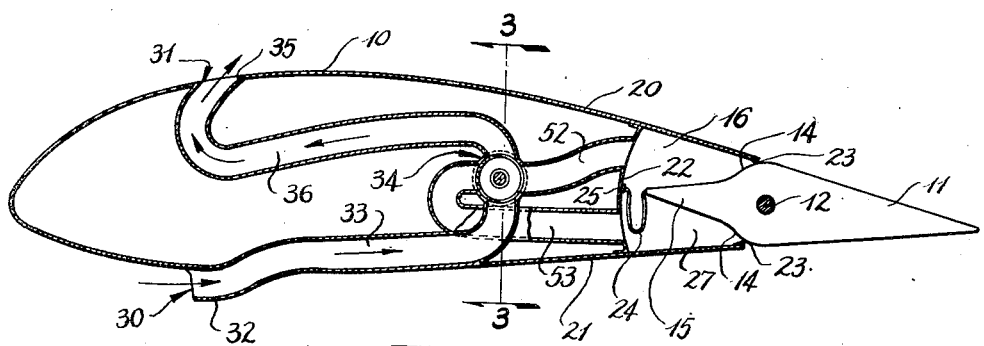
Fig 2 is a sectional view, drawn to enlarged scale, taken along the lines 2—2 in Fig. 1, the internal structure of the wing being omitted to show more clearly the construction and arrangement of the aerodynamic boost mechanism.
Figure 3:
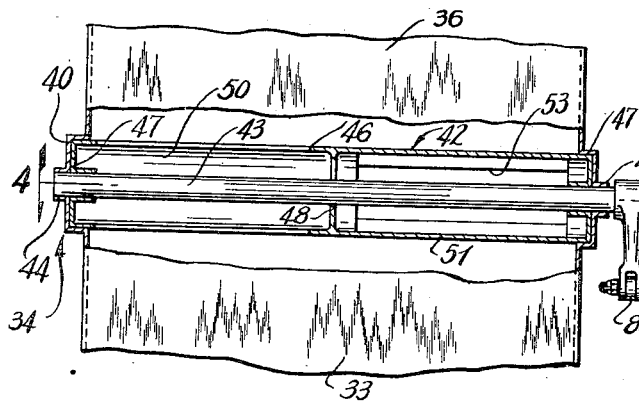
Fig. 3 is a still further enlarged sectional view taken along the lines 3—3 in Fig. 2, through the valve mechanism.
Figure 4:
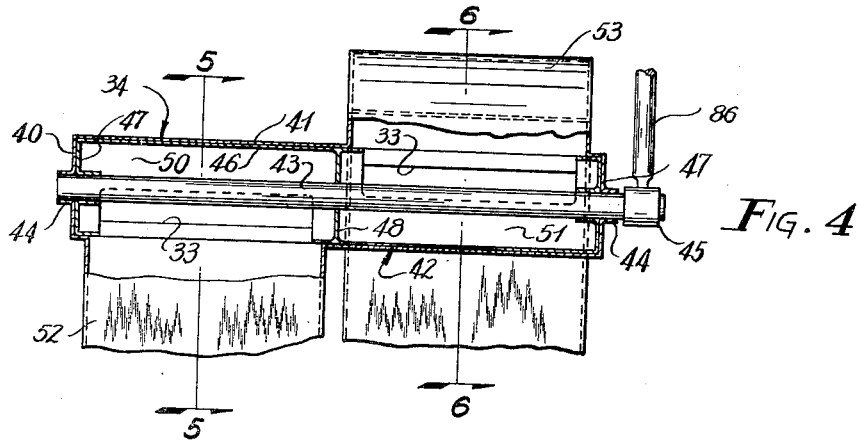
Fig. 4 is a vertical sectional view taken along the lines 4—4 in Fig. 3, showing the valve rotated to one of its operating positions.

When the valve member 42 is in neutral or centered position, as shown in Figs. 2, 3, and 4, the ducts 33 and 36 are each half closed by the valve gates 50 and 51. Hence, air which is taken in by the scoop 32 passes along duct 33, through the valve 34, and is drawn out through duct 36, spilling out of the opening 35. Since the ducts 33 and 36 are open to the same extent in each of the valve compartments when the valve is in neutral position, the resulting pressure in both of the compartments is the same and the pressure on opposite sides of the balance baffle 15 is the same.

Figures 5, 6:
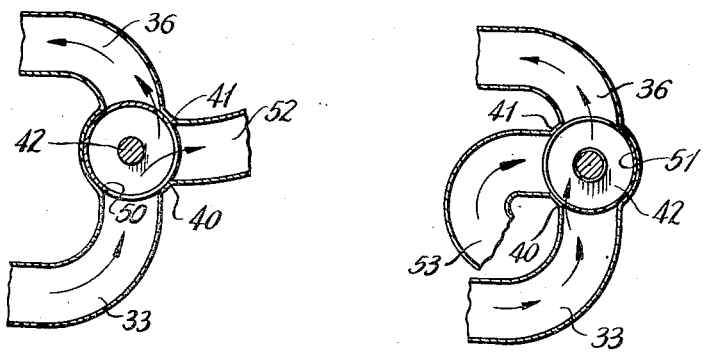
Fig. 5 is a sectional view taken along the line 5—5 in Fig. 4.
Fig. 6 is a corresponding view of the other valve section at the same instant, the section line being designated 6—6 in Fig. 4.

If the valve member 42 is rotated, however, to the position shown in Figs. 5 and 6 or to any intermediate position between neutral and extreme operating position, the pressure within the left-hand compartment will rise due to partially closing the exit duct 36 and simultaneously opening the entrance duct 33. At the same time, the pressure within the right-hand compartment will fall due to partially closing the entrance duct 33 and simultaneously opening the exit duct 36. The resulting pressure differential on opposite sides of the balance member 15 (high pressure in the top compartment and low pressure in the bottom) produces a hinge moment on the control surface 11, swinging the latter to the position shown in Fig. 7, or to an intermediate position if the valve has been rotated to an intermediate position between neutral and extreme operating position. The magnitude of the hinge moment on the control surface is directly proportional to the pressure difference on opposite sides of the balance baffle 15, and the pressure difference, in turn, is proportional to the angular displacement of the valve member 42 from its neutral position, hence the relative position of the control surface 11 for any given aerodynamic condition is determined by the relative position of the valve member 42.

Figure 11:
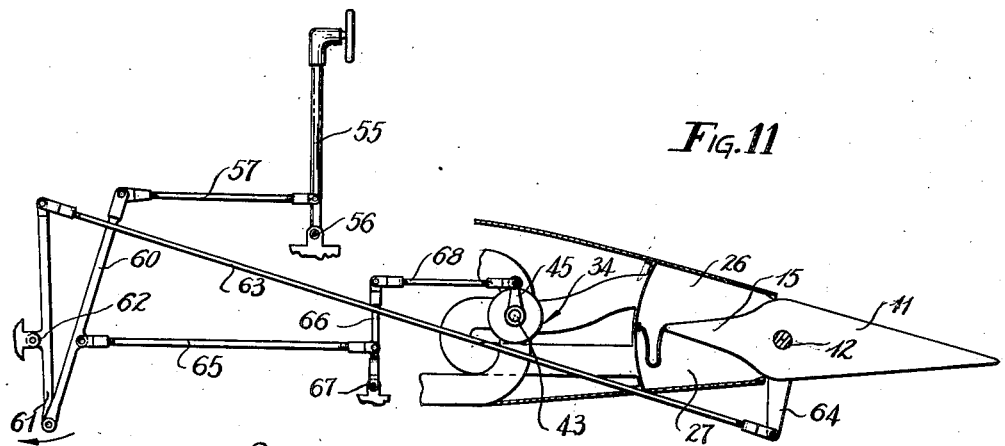
Fig. 11 is a schematic diagram of the linkage in the control system.

In the preferred embodiment of my invention, the valve member 42 is connected to the control column or stick of the airplane and is adapted to be actuated thereby through a system of linkage shown diagrammatically in Fig. 11. The control column is indicated by the reference numeral 55 and is pivotally supported at 56 on the airplane structure for fore and aft swinging movement. Since fore and aft movement of the control column produces longitudinal control of the airplane, the control surface 11 represents either an elevator of a conventional airplane or an elevon of a tailless airplane. Similar linkage systems and booster mechanisms would be employed for each of the other control surface systems on the airplane, but only one of such systems is shown and described herein for the sake of simplicity. A link 57 is connected to the control column 55 above the pivots 56 and to the upper end of a scissors member 60, the lower end of member 60 being pivotally joined to the lower end of a second scissors member 61. Member 61 is swingably supported intermediate its ends at a fixed pivot point 62, and the upper end of member 61 is connected by a follow-up link 63 to a downwardly extending horn 64 on the control surface. A link 65 is connected to member 60 intermediate its ends and to a lever arm 66 intermediate its ends, arm 66 being swingably supported on a fixed pivot point 67. A link 68 connects the upper end of arm 66 to the end of the valve operating arm 45, the purpose of the arm 66 being to multiply the motion of the link 65.

The operation of the control system linkage is as follows: When the control column 55 is pulled back, or to the right as viewed in Fig. 11, scissors member 60 is swung to the right about the pivot connection at its lower end, pushing link 65 to the right. Arm 66 is swung in a clockwise direction about pivot 67 by this movement of the link 65, causing the operating arm 45 and valve member 42 to rotate in a clockwise direction whereby a higher pressure is obtained in the upper compartment 26 than in the lower compartment 27. The hinge moment produced by the pressure differential acting on balance 15 causes the control surface 11 to swing upwardly. As the horn 64 swings counter-clockwise with the control surface 11, the link 63 rocks member 61 in a clockwise direction about the fixed pivot 62. This moves the connection at the bottom of member 61 to the left, pulling link 65 with it and rotating the actuating arm 45 and valve member 42 in a counter-clockwise direction to a position at which the hinge moment due to the pressure differential on opposite sides of balance 15 is equal to that due to the airloads acting on control surface 11, and a condition of equilibrium is reached.

If a gust should strike the control surface 11 from below, swinging it up, or counter-clockwise, while the control column 55 is held against movement, the horn 64 will pull the scissors member 61 around in a clockwise direction, rotating the operating arm 45 and valve member 42 in a counter-clockwise direction to produce a hinge moment restoring the control surface to its original position before displacement. Thus, the follow-up action of the control system linkage described above tends always to maintain a given angular relationship, except for the motion lost in actuating the valve, between the control surface 11 and the control column 55, and any force acting to disturb that relationship, whether the force be applied at the column 55 or at the surface 11, causes the valve 34 to be actuated in a manner to produce a hinge moment for restoring the said relationship.

It should be mentioned at this point that apparent discrepancies between the control system linkage as shown in Fig. 1 and that illustrated in Fig. 11 are due to the fact that Fig. 11 is a diagrammatical sketch to illustrate in the simplest form the general arrangement and function of the several parts, whereas, Fig. 1 is a plan view of a suggested installation, with its particular requirements due to structural or other mechanical conditions. Accordingly, push-pull rod 82 in Fig. 1 may be identified as either the link 65 or 68 in Fig. 11. The outer end of the push-pull rod 82 is connected to the short, rearwardly extending arm 83 of a bell crank which is pivoted at 84, and the long, spanwise extending arm 85 of the bell crank is connected at its outer end to a link 86 which is connected to the operating arm 45 on the shaft 42 of the valve 34. The different length arms of the bell crank act to multiply the motion of rod 82 so as to obtain a greater angular movement of the valve member 42 and correspondingly greater response of the control surface.

Figure 8:
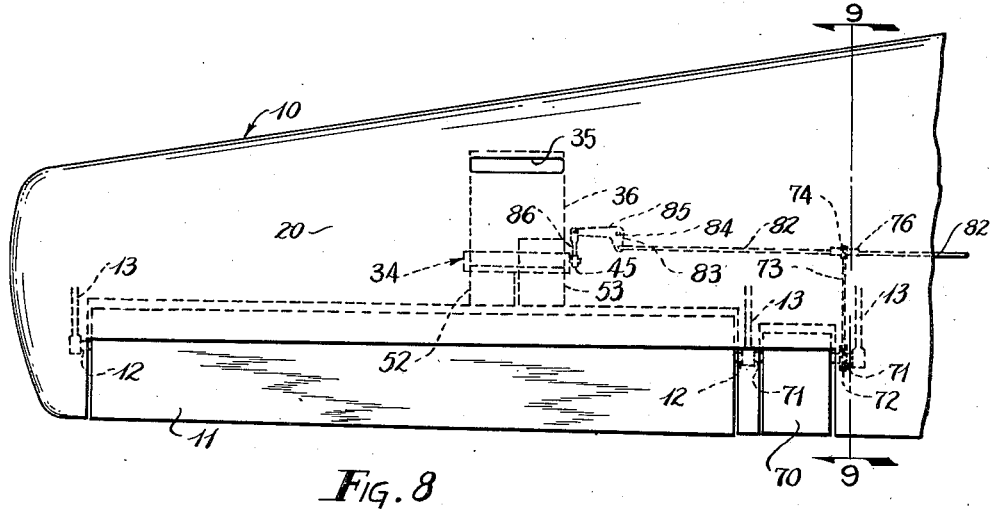
Fig. 8 is a view similar to Fig. 1 but showing, in addition, a flipper which is adapted to trail upwardly at high angles of attack and is operatively connected to the valve means to overcome the increment of hinge moment on the control surface caused by stalling or partial stalling of the wing.
Figure 9:
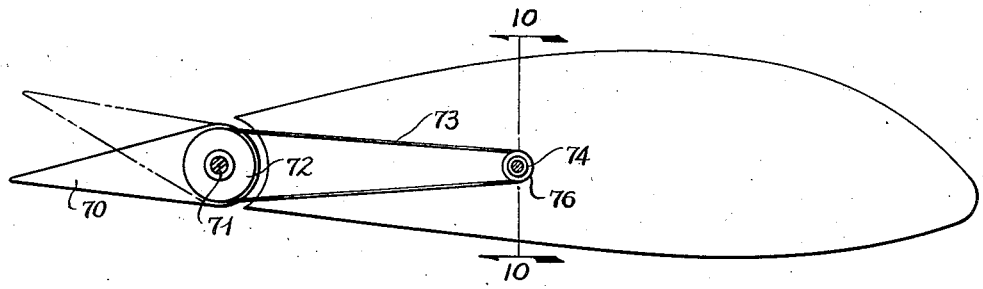
Fig. 9 is a sectional view taken along the line 9—9 in Fig. 8, showing in broken lines the upwardly trailing position taken by the freely floating flipper at high angles of attack.
Figure 10:
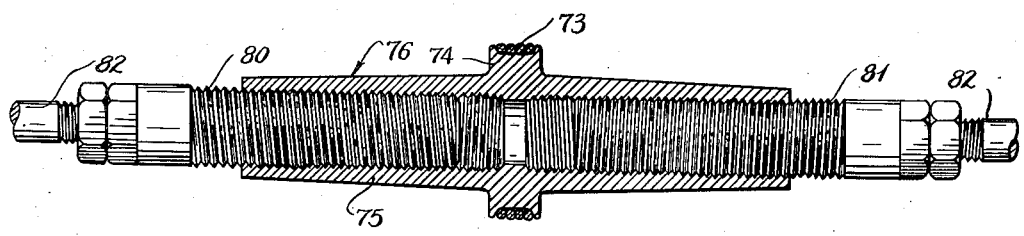
Fig. 10 is an enlarged sectional view taken along the line 10—10 in Fig. 9.

An alternative arrangement, illustrated in Figs. 8, 9, and 10, is adapted for use with a control system having no follow-up linkage such as that shown in Fig. 11. In this embodiment of the invention means are provided for overcoming the tendency of the control surface 11 to trail upwardly at high angles of attack, and this is accomplished by the use of a flipper 70 which is disposed in the trailing edge of the wing 10 inboard of the control surface 11, said flipper being in the nature of a round-nosed, short span flap having hinge pins 71 at its ends, which are journaled in the bracket supports 13. The flipper 70 is free to swing up or down under the influence of the changing pressure distribution over the airfoil at increased angles of attack, and its sole function is to superimpose a certain amount of valve actuation on the control system linkage so as to control the "zero" position of the valve as a function of the angle of attack, and thereby reduce the trailing angle of the control surface to the desired value. To this end a large diameter sheave wheel 72 is fixedly mounted on the inboard hinge pin 71 to rotate with the flipper 70, and a cable or line 73 is trained around and attached thereto. The cable 73 extends forwardly from the sheave wheel 72 and is trained around a smaller sheave wheel 74 comprising an integral part of the body 75 of a turnbuckle 76 (see Fig. 10). Threaded members 80 and 81 of opposite hand lead are screwed into the ends of the turnbuckle body, and these members are secured, in turn, to the ends of the push-pull rods 82 forming a part of the control system linkage as shown in Fig. 8.

The operation of the flipper 70 is as follows: When the flipper swings up to the position shown in broken lines in Fig. 9, rotation of the sheave wheel 72 causes the small sheave wheel 74 to be rotated through a correspondingly greater angle due to the difference in their diameters. Rotation of the turnbuckle body 75 draws the threaded members 80 and 81 together, effectively shortening the length of push-pull rod 82 and operating the valve 34 to produce a balance hinge moment acting to reduce the trailing angle of the control surface 11 to the desired value. When the pilot moves the control column 55, the valve member 42 is rotated from the zero position imposed by the flipper, but neither the length of the push rod 82 nor the position of the flipper 70 is affected by movement of control surface 11 or control column 55.

Figure 13:
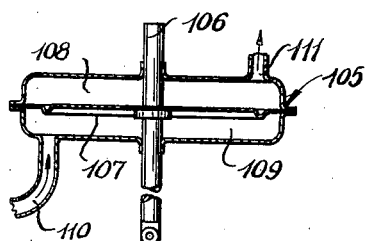
Fig. 13 is a schematic diagram of another embodiment of the means for overcoming the upwardly trailing tendency of the control surface.

Another embodiment of the means for overcoming the tendency of the control surface 11 to trail upwardly when the wing is stalled or partially stalled is shown more or less schematically in Fig. 13. In this arrangement, a chamber 105 is provided which is rigidly fixed to any suitable part of the airplane structure, and extending vertically through the chamber is a slidable rod 106. Fixed to the rod 106 inside the chamber is a diaphragm 107 which is suitably sealed to the side walls of the chamber and divides it into upper and lower compartments 108 and 109, respectively. A duct 110 communicates with the lower compartment 109 and is connected to a forwardly opening ram air scoop (not shown) whereby the lower compartment is pressurized to the extent of the available dynamic pressure. A second duct 111 communicates with the upper compartment 108 and is connected to a rearwardly directed opening (not shown) which is located in a low pressure region on the fuselage or airfoil so that a reduced (static) pressure proportional to the airspeed is obtained in the upper compartment. The pressure differential on opposite sides of the diaphragm 107 resulting from the positive, or dynamic pressure in the lower compartment, and the negative, or static pressure in the upper compartment exerts an upwardly directed force on the diaphragm proportional to the dynamic pressure of the flow which is denoted by the symbol $q$ and is defined: $q = \frac{1}{2}pV^2$ where $p$ is the density of air and $V$ is the true air speed.

Connected to the lower end of the rod 106 is a link 112, the lower end of which is connected, in turn, to the upwardly extending arm 113 of a bell crank 114. Rod 106, link 112, and arm 113 are arranged to lie in a stright line when fully extended, as shown in solid lines in Fig. 13. The bell crank 114 is pivotally supported on a fixed pivot 115 and has a horizontally extending arm 116, to the outer end of which is affixed a weight 117. A sheave wheel 118 is fixed to the bell crank 114 with its center at the pivot 115, and trained around and attached to the sheave wheel is a cable 119. The cable 119 is also trained around and attached to a smaller sheave wheel 74a comprising an integral part of the body of a turnbuckle 76a which is the same in construction and function as turnbuckle 76 illustrated in Figs. 9 and 10 and described earlier. Turnbuckle 76a operates to extend or shorten control rod 82a when it is turned, actuating the valve 34 in the manner previously described to reduce the trailing angle of the control surface to the desired value.

The operation of the device described above is as follows: The differential air pressure obtained on opposite sides of the diaphragm 107 urges the latter upwardly, tending to straighten the linkage into the straight line condition shown in solid lines. At the same time, the moment produced by the weight 117 acting downwardly on the end of the arm 116 tends to rotate the bell crank 114 in a clockwise direction and jack-knife the members 112 and 113 as shown in broken lines. Since the moment produced by the weight 117 is opposed by the moment produced by the force acting on the diaphragm 107 and applied to arm 113 of bell crank 114, it is seen that the position of rest assumed by the bell crank 114 is a function of the dynamic pressure of the air flow, which, in turn, is proportional to the square of the airspeed. As the total pressure on the diaphragm 107 decreases, the bell crank 114 rotates in a clockwise direction until the resulting moment arm has correspondingly increased in length to produce a condition of equilibrium between the opposing moments. When the airplane is flying at a relatively high speed and low angle of attack, the total force acting on the diaphragm is high and the pull exerted thereby extends the linkage 106, 112, and 113 to substantially a straight line. As the airplane approaches a stall, however, the total force acting on the diaphragm drops off and the bell crank 114 rocks to the corresponding position of rest, rotating the turnbuckle 76a and actuating the valve 34 to overcome the upwardly trailing tendency of the control surface when it is partially stalled.

Figure 12:
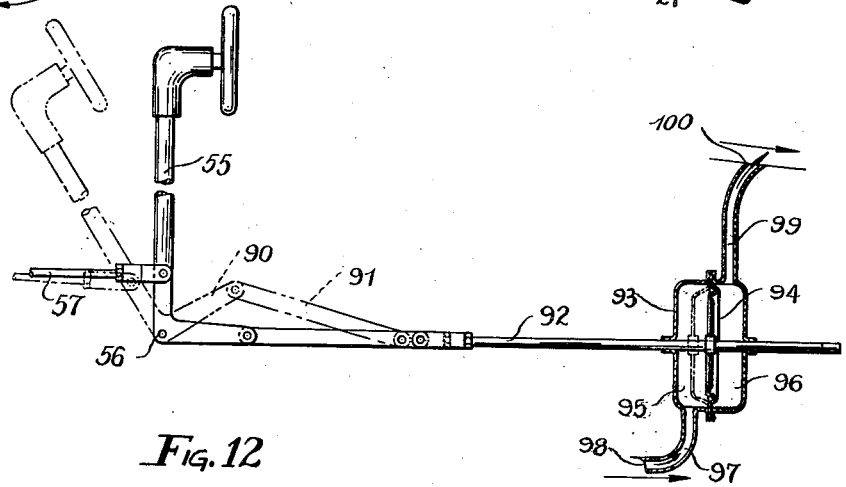
Fig. 12 is a diagrammatic side elevation of the mechanism for loading the control system to impact a sense of feel thereto.

Although the control system as described up to this point is complete and operative from a functional standpoint, such a system is devoid of any "feel" of the airloads acting upon the control surfaces, and lacking in the normal tendency of the controls to center themselves. Since this feel is deemed highly desirable by the majority of pilots, there is provided in the control system a means for applying a load thereto which duplicates the feel of directly connected controls. The loading means is illustrated more or less schematically in Fig. 12, and is similar in construction to the arrangement shown in Fig. 13, comprising an arm 90 which is rigidly fixed to the lower end of the control column 55 at right angles thereto. A link 91 is connected to the arm 90 and to one end of a rod 92 which extends through and is slidable in a chamber 93, the arm 90, link 91, and rod 92 being disposed in a straight line when the control column 55 is in its neutral or centered position. Fixed to the rod 92 inside the chamber 93 is a diaphragm 94 which divides the chamber 93 into two separate, pressure-tight compartments 95 and 96. A duct 97 terminating in a forwardly facing ram airscoop 98 is connected to compartment 95, while a second duct 99 terminating in a rearwardly directed opening 100 located in a low pressure region on the fuselage or airfoil is connected to compartment 96. As in the case of the arrangement shown in Fig. 13, there is a pressure differential proportional to the speed of the airplane created on opposite sides of the diaphragm 94, urging the latter to the right. When the control column 55 is moved in either direction from its centered position, however, the arm 90 and links 91 are jack-knifed upwardly or downwardly, as the case may be, pulling the rod 92 to the left against the pressure exerted on the diaphragm. The force on the diaphragm 94 is constant for any given air speed, but the hinge moment produced by the mechanism on the control column 55 increases as the angular deflection of the control column increases due to the greater moment arm. The total force on the diaphragm is proportional to the dynamic pressure of the flow; hence the loading force exerted on the control column 55 varies as the square of the air speed in exactly the same manner that the airloads on the control surface vary, and the resulting stick-force is similar to that experienced with controls connected directly to the control surfaces, acting at all times to return the control column to its neutral, centered position.

While I have shown and described in detail one preferred specific embodiment of the broad invention, it is to be understood that various modifications of the structure and connecting linkage may be made within the scope of the present invention, and all such modifications are contemplated as falling within the spirit and scope of the invention as claimed.

I claim:

1. In an aircraft having a movable control surface, operating means for said control surface comprising, in combination, a closed chamber on the aircraft, a member connected to said control surface and movable therewith, said member being disposed within said chamber and dividing it into two separate pressure-tight compartments, a source of dynamic pressure, a source of static pressure, valve means for mixing said pressures in varying proportions to obtain two dissimilar resultant pressures and admitting said resultant pressures to opposite sides of said member to operate said control surface, control means connected to said valve means for actuating the latter, a chamber having a movable partition therein dividing it into two pressure-tight compartments, means for obtaining a pressure differential on opposite sides of said partition which is a function of the speed of the aircraft, a member supported on the aircraft for rotation about a horizontally disposed pivot, a weight affixed to said member at a point spaced horizontally from said pivot and producing a moment in said member, and means connecting said partition to said member whereby the force exerted on the partition is applied to said member to produce a moment opposing the moment produced by said weight, and means connecting said member to said control means whereby rotation of the member due to the reduction of the force acting on said partition when the aircraft is traveling at relatively low speeds actuates said valve means to produce a hinge moment in said control surface acting to overcome the tendency of the latter to trail upwardly at or near the stalled condition.

2. In an aircraft having a movable control surface, operating means for said control surface comprising, in combination, a closed chamber on the aircraft, a member connected to said control surface and movable therewith, said member being disposed within said chamber and dividing it into two separate pressure-tight compartments, first duct means opening into the airstream in a direction and at a location whereby a positive pressure is available, second duct means opening into the airstream in a direction and at a location whereby a negative pressure is available, valve means connected to said first and second duct means and to said two compartments for mixing the available pressures in varying proportions into two dissimilar resultant pressures and directing said resultant pressures into opposite sides of said member to operate said control surface, control means connected to said valve means for actuating the latter, a chamber having a movable partition therein dividing it into two pressure-tight compartments, means for obtaining a pressure differential on opposite sides of said partition which is a function of the speed of the aircraft, a bell crank supported for vertical swinging movement and having a normally horizontal arm with a weight affixed to the outer end thereof, a second arm on said bell crank, means connecting said partition to said second arm whereby the force exerted on the partition is applied to said bell crank to produce a moment opposing the moment produced by said weight, and means connecting said bell crank to said control means whereby rotation of the bell crank due to reduction of the force acting on said partition when the aircraft is traveling at relatively low speeds actuates said valve means to produce a hinge moment on said control surface acting to overcome the tendency of the latter to trail upwardly at or near the stalled condition.

3. In an airplane control system, a pilot's control element, a control surface, a servomotor mechanism connected to move said control surface, said servomotor mechanism forming the sole actuating mechanism for movement of said control surface, a source of power for said servomotor mechanism, servomotor control means for controlling the energization of said mechanism from said power source, a control linkage connecting said servomotor control means to said pilot's control element for movement of said surface under power in accordance with the movements of said pilot's control element, said boost power control means being the sole possible load other than control linkage friction on said pilot's control element over the entire range of movement of said pilot's control element and said linked power boost control means, air speed indicating means, and dimension changing means in said linkage operated by said air speed indicating means to change the position relation of said pilot's control element and said servomotor control means without substantially changing the load on said pilot's control element.

4. In an airplane control system, a pilot's control element, a control surface, a servomotor mechanism connected to move said control surface, said servomotor mechanism forming the sole actuating mechanism for movement of said control surface, a source of power for said servomotor mechanism, servomotor control means for controlling the energization of said mechanism from said power source, a control linkage connecting said servomotor control means to said pilot's control element for movement of said surface under power in accordance with the movements of said pilot's control element, said boost power control means being the sole possible load other than control linkage friction on said pilot's control element over the entire range of movement of said pilot's control element and said linked power boost control means, dimension changing means in said linkage operable to change the position relationship of said pilot's control element and said servomotor control means, and means operating said dimension changing means as a function of air speed without substantially changing the load on said pilot's control element.

5. Apparatus in accordance with claim 3, wherein said air speed means is connected to said dimension changing means to cause said servomotor mechanism to move in a direction imposing a centralizing moment on said control surface at speeds approaching the stalling speed of said airplane.

6. In an aircraft having a movable control surface, a fluid pressure motor connected to move said surface said fluid pressure motor forming the sole actuating mechanism for the movement of said surface, a source of fluid pressure, valve means for actuating said motor, a pilot's control element, a linkage connecting said valve means with said pilot's control element, said linkage determining the position relation of said valve means and said pilot's control element, said valve means being the sole possible load other than linkage friction on said pilot's control element over the entire range of movement of said pilot's control means and said linked valve means, linkage changing means operable to change said position relationship, a load surface exposed to pressure developed by said airplane in flight and movable thereby, said latter surface being connected to said linkage changing means to change the relative position of said pilot's control element and said valve means in accordance with movements of said load surface without substantially changing the load on said pilot's control element.

7. Apparatus in accordance with claim 6, wherein means are provided to apply a dynamic pressure developed by the airplane in flight to one side of said load surface together with means for providing not more than static pressure on the other side of said load surface.

8. In an aircraft having a movable control surface, a fluid pressure motor connected to move said surface, a source of fluid pressure, valve means for actuating said motor, a pilot's control element, a linkage connecting said valve means with said pilot's control element, said linkage determining the position relationship of said valve means and said pilot's control element, means operable to change a dimension of said linkage to change said position relationship, a chamber having a movable partition therein dividing it into two pressure-tight compartments, means for obtaining a pressure differential proportional to the speed of the aircraft, a member supported on said aircraft for rotation around a horizontally disposed pivot to said member, means applying a force producing a moment in said member, means connecting said partition to said member whereby the force exerted on said partition is applied to said member to produce a moment opposing the moment produced thereon by said force producing means, and a connection between said member and said dimension changing means whereby rotation of said member changes the dimension of said linkage to change the position relation of said valve to said pilot's control element.

9. Apparatus in accordance with claim 3 wherein said servomotor mechanism is an air operated mechanism and wherein said source of power is a means for transmitting a dynamic air pressure resulting from flight of said airplane to said servomotor control means.

10. Apparatus in accordance with claim 4 wherein said servomotor mechanism is an air operated mechanism and wherein said source of power is a means for transmitting a dynamic air pressure resulting from flight of said airplane to said servomotor control means.

11. Apparatus in accordance with claim 6 wherein said fluid pressure motor is an air operated motor and wherein said source of fluid pressure is means for transmitting dynamic air pressure resulting from flight of said airplane to said valve means.

12. Apparatus in accordance with claim 8 wherein said fluid pressure motor is an air operated motor and wherein said source of fluid pressure is means for transmitting a dynamic air pressure resulting from flight of said airplane to said valve means.

IRVING L. ASHKENAS.

REFERENCES CITED

The following references are of record in the file of this patent:

UNITED STATES PATENTS

| Number | Name | Date |
|---|---|---|
| 1,351,538 | Reynolds | Aug. 31, 1920 |
| 1,752,396 | Rumford | Apr. 1, 1930 |
| 1,818,104 | Sperry | Aug. 11, 1931 |
| 1,832,159 | Vanderlip | Nov. 17, 1931 |
| 1,897,285 | Veit | Feb. 14, 1933 |
| 1,956,755 | Constantin | May 1, 1934 |
| 2,069,605 | Fischel | Feb. 2, 1937 |
| 2,147,638 | DePort | Feb. 21, 1939 |
| 2,169,982 | Manteuffel | Aug. 15, 1939 |
| 2,176,807 | Wunsch | Oct. 17, 1939 |
| 2,205,610 | Van Nes | June 25, 1940 |
| 2,222,886 | Voigt | Nov. 26, 1940 |
| 2,295,159 | Child | Sept. 8, 1942 |
| 2,297,412 | Hoppe | Sept. 29, 1942 |
| 2,331,047 | Schairer | Oct. 5, 1943 |
| 2,366,382 | Burton | Jan. 2, 1945 |

FOREIGN PATENTS

| Number | Country | Date |
|---|---|---|
| 441,603 | France | May 30, 1912 |
| 321,851 | Great Britain | Dec. 3, 1928 |